Aug. 29, 1933. C. BIRDSEYE 1,924,903
CONSUMER PACKAGE OF MEAT PRODUCTS
Filed May 17, 1929
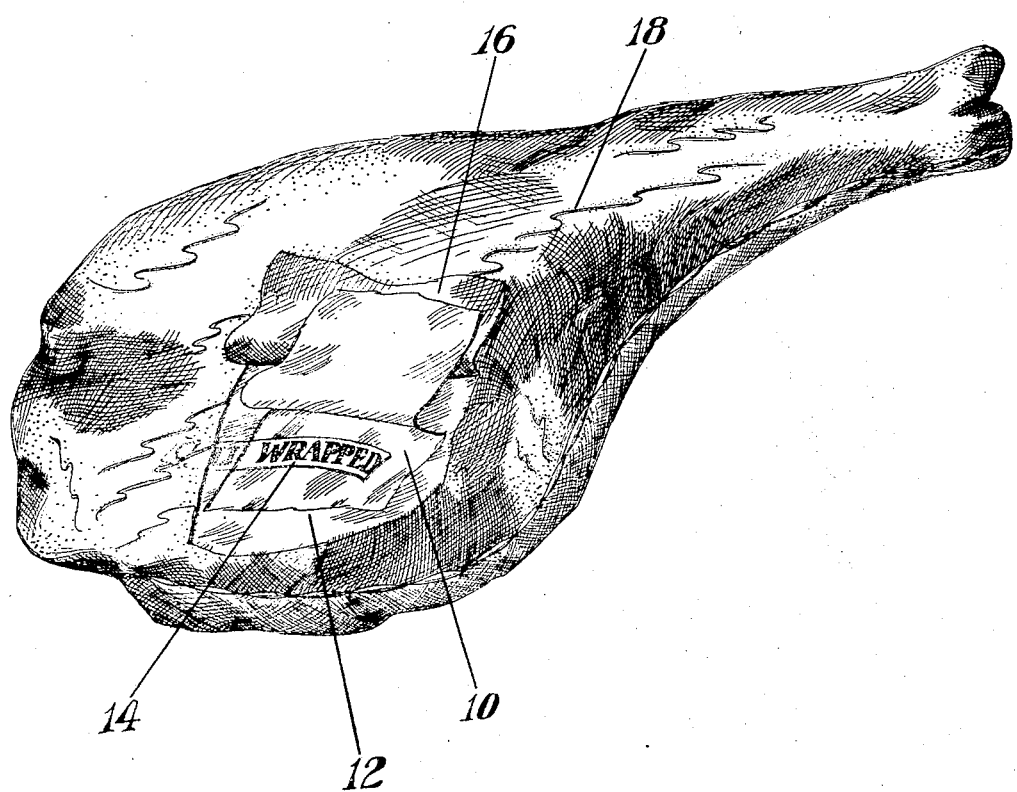
INVENTOR
Clarence Birdseye.

Patented Aug. 29, 1933

1,924,903

UNITED STATES PATENT OFFICE 1,924,903

CONSUMER PACKAGE OF MEAT PRODUCTS

Clarence Birdseye, Gloucester, Mass., assignor, by mesne assignments, to Frosted Foods Company, Inc., Dover, Del., a corporation of Delaware Application May 17, 1929. Serial No. 363,846

5 Claims. (Cl. 99—14)

This invention relates to consumer packages for use in the distribution and storage of meat or flesh products.

My invention is concerned with those important problems of preparing such perishable fresh foods in unit quantities convenient for domestic consumption without loss of the essential characteristics of the fresh food-stuff, protecting it against desiccation and deterioration from both internal and external sources and adapting it to be transported, stored and distributed without impairment in any of these particulars.

In one important aspect, my invention consists in a novel consumer package which may be produced in quick-freezing fresh flesh products by any commercial process now available. The process of quick-freezing, as will be understood, preserves fresh food substances in general, and notably fresh meat or fish, in substantially its fresh condition, without deterioration in the mechanical construction of its tissue, substantially lessening autolysis, putrefaction and oxidation, preserving the vitamin content and eliminating loss of savory substances and nutritive constitutents when the material is thawed.

I have discovered that meat products, quick-frozen by any process, may be guarded against desiccation and presented intact to the consumer in attractive form by being first wrapped with a thin, substantially moisture and vapor-proof lining which will conform intimately to the surface of the product, and then enclosed in a woven fabric covering which holds the lining in place and itself furnishes a superficial anchorage for a glaze which, in turn, provides a transparent shell for the package and still further safeguards its contents against desiccation, oxidation, and all sources of contamination. An important advantage incident to a package of this character is its universal range of adaptability for products of all sorts of shapes and size. The same material and the same process may be used with equal facility in preparing ham, pork, lamb, saddles of mutton, poultry, steaks, and all the various items of meat products handled by distributors dealing in the widest variety of such products.

Where it is desired to trade-mark the product, this may be done effectively by affixing the mark directly to the surface of the meat or to its transparent wrapping. The trade-mark is then exposed and visible to the purchaser through the loose mesh of the textile covering and through the transparent ice glaze which forms the shell of the package.

These and other features of the invention will be best understood and appreciated from the following description of its application to the packaging of a leg of lamb, illustrated in the single figure of the accompanying drawing.

The leg of lamb 10 is first trimmed and otherwise prepared for the use of the ultimate consumer. It is then wrapped in a cellulose lining 12, or other thin, transparent, flexible, substantially moisture-proof material. Regenerated cellulose is particularly well suited for this purpose, having sufficient toughness and pliability to be wrapped about a meat body of irregular shape and to make intimate contact with the surface thereof.

In the illustrated example, a trade-mark 14 is shown as applied in the form of a label directly to the surface of the meat and which will, consequently, be exposed and visible through the transparent material of the wrapping 12. Having shaped the wrapping 12 to the contour of the body of the meat, the wrapped meat is next enclosed in a woven covering 16 of textile material. I have found stockinet particularly well suited for the requirements of the case but any loosely woven, somewhat elastic and self-conforming textile material would serve as well. The textile covering 16 is secured in place by basting or otherwise, and serves to hold the lining 12 in place and in intimate contact with the body of the package. Being of a somewhat tough character, it protects the more fragile lining 12 against being torn or punctured in handling. It is also, on account of its loose weave, semi-transparent and so exposes the trade-mark.

So far as I am aware, the frozen package produced as above outlined and having a two-ply transparent covering has not been used heretofore and possesses to a certain degree the advantages already set forth. I prefer, however, to complete the package by providing for it a hard, transparent, moisture-proof shell and this I effect by forming a glaze 18 upon the exterior thereof. It will be understood that a permanent glaze could be formed only with some difficulty upon a package presenting a smooth surface such as that of the sheet cellulose lining 12. The woven textile covering 16, however, forms a superficial anchorage over the lining 12 and is adapted to hold a glaze securely in place.

The glaze or glaze shell 18 of the package may be formed in any convenient manner as, for example, by dipping the wrapped and covered package in cold fresh water and then exposing it to a freezing atmosphere. In the glaze thus formed will be imbedded the textile fabric of the covering.

In the accompanying drawing the nature of the covering is illustrated by showing a portion of the shell 18 and fabric covering 16 torn and folded back. A similar smaller portion of the transparent cellulose wrapping is also represented as being torn and folded back so as to expose the surface of the meat 10 and the trade-mark 14 beneath it.

The package thus prepared may be maintained in suitable cold storage indefinitely without deterioration. Such evaporation as takes place from it will occur from its glazed shell and this may be renewed at intervals after wastage has occurred. The package may be shipped and handled by the retailer without danger to the integrity of its contents and delivered to the consumer, ready for his use, without impairment in any particular.

In addition to protecting the contents of the package while it is in storage or being transported for distribution, the moisture-proof cellulose lining serves the added purpose, if the finished package is ice-glazed, of preventing the water from the glaze from reaching and injuring the product when the latter is being thawed preparatory to use.

The package therein disclosed and the method of producing the same solve many problems encountered in the storage, preservation and distribution of frozen flesh or meat products. For example, it is important that the frozen product be not only protected from contact with air to prevent oxidation but that no free space should occur between the wrapper and the product for other important reasons. In the first place, if there is any space permitting air circulation within the wrapper, desiccation takes place at an objectionable rate, the moisture leaving the product and being carried to the cold surface of the wrapper where it will condense and eventually escape. In the second place, moisture condensed upon the inside of the wrapper renders the latter more or less opaque, obscuring the product and also the trade-mark which it may carry. By using a thin flexible transparent material, such as sheet cellulose, for the first wrapper and surrounding this by a yielding textile covering, I am enabled to bring the inner wrapper into intimate contact with the soft moist surface of the meat product, causing the wrapper to adhere thereto without the interposition of air spaces, so that in the subsequent freezing operation the transparent wrapper is frozen directly to the meat product. It thus becomes substantially invisible so that the consumer may inspect the appearance of the product and the identifying marks which it may carry. This contributes largely to the salability of the complete package and is an important advantage incident to my invention.

It will furthermore be noted that by wrapping the soft moist product in unfrozen condition, less wrapping material is required on account of its yielding character and that the labor and skill of applying the wrapper is less than would be required in the wrapping of a rigid product. I contemplate, therefore, wrapping the product in an unfrozen or only partially frozen condition, and complete the package by a freezing operation.

My invention is further applicable to the production of a frozen package in that it permits the expansion of the product incident to freezing without destroying the integrity of the wrapping. This is because the thin flexible inner wrapping is yieldingly held in position upon the product without positive sealing so that its overlapping edges are permitted to yield to some extent and the wrapping as a whole to accommodate itself to expansion of the product.

I have described my invention in its application to quick-frozen fresh meat products and it is in this application that the greatest value of the invention resides. The invention contemplates, however, the packaging of fish products, such as salmon, blue fish, pompano, etc., and the term flesh product is herein used in a broad sense to cover any food substance of animal origin and including seafoods in this term. It would also be within the scope of the invention to produce the package by the slower methods of freezing.

While in one aspect my invention consists in the package herein disclosed, the method of producing the same is also believed to be novel and comprises another aspect of my invention.

Having thus described my invention, what I claim as new and desire to secure by Letters Patent of the United States is:

1. A frozen marketable package comprising a meat product enclosed in a thin, transparent, substantially moisture-proof wrapping, and a flexible woven covering holding said wrapping in intimate contact with the surface of the meat product over substantially its entire area thereby excluding air from contact therewith, the entire package and contents being frozen into a solid unit with the wrapper frozen to the surface of the meat product.

2. A frozen marketable package comprising a meat product having a trade-mark affixed to its surface, a wrapping of sheet cellulose or the like enclosing the product and making intimate contact with the surface thereof over its entire area including the trade-mark, and a flexible woven covering holding the wrapping in place upon the product, the trade-mark being exposed through the wrapping and covering, and the wrapping being frozen directly to the surface of the product without the interposition of space for the circulation of air.

3. A frozen marketable package comprising a meat product enclosed in a thin, transparent, substantially moisture-proof wrapping, a flexible woven covering enveloping said wrapping and presenting a rough superficial anchorage, and an ice glaze enveloping the package upon such anchorage, the covering thus provided being frozen to the meat product without the interposition of appreciable space for the circulation of air.

4. The method of making a frozen marketable package which consists in wrapping a unit of fresh moist meat product in sheet cellulose, covering the wrapped unit with a self-conforming fabric and thereby bringing the cellulose wrapper into intimate contact with the moist surface of the meat and causing it to adhere thereto without the interposition of appreciable air spaces, and then freezing the package so that the cellulose wrapping becomes frozen to the surface of the product.

5. The method of making a frozen marketable package which consists in wrapping a unit of fresh moist meat product in sheet cellulose, covering the wrapped unit with a self-conforming fabric and thereby bringing the cellulose wrapper into intimate contact with the moist surface of the meat and causing it to adhere thereto without the interposition of appreciable air spaces, freezing the package so that the cellulose wrapping becomes frozen to the surface of the product, and providing an ice glaze anchored upon the fabric covering.

CLARENCE BIRDSEYE.